United States Patent
Maimone

(10) Patent No.: US 6,910,563 B2
(45) Date of Patent: *Jun. 28, 2005

(54) MOTORCYCLE AUTOMATIC CLUTCH WITH MANUAL RELEASE

(75) Inventor: Bud A. Maimone, Poland, OH (US)

(73) Assignee: Cobra Motorcycle Mfg., Inc., North Lima, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/390,564

(22) Filed: Mar. 17, 2003

(65) Prior Publication Data

US 2004/0000443 A1 Jan. 1, 2004

Related U.S. Application Data

(63) Continuation of application No. 09/842,367, filed on Apr. 25, 2001, now Pat. No. 6,533,056.
(60) Provisional application No. 60/199,490, filed on Apr. 25, 2000.

(51) Int. Cl.[7] ............................................. F16D 43/08
(52) U.S. Cl. ..................................... 192/83; 192/105 B
(58) Field of Search .......................... 192/83, 96, 99 S, 192/105 B

(56) References Cited

U.S. PATENT DOCUMENTS

| | | | | |
|---|---|---|---|---|
| 2,368,299 A | * | 1/1945 | Hayter | 192/103 A |
| 2,746,555 A | * | 5/1956 | Dalrymple et al. | 180/10 |
| 3,035,460 A | * | 5/1962 | Guichard | 475/186 |
| 3,215,234 A | | 11/1965 | Hirano | |
| 3,219,161 A | * | 11/1965 | Villeple et al. | 192/3.51 |
| 3,265,172 A | | 8/1966 | Atsumi et al. | |
| 3,762,519 A | | 10/1973 | Bentley | |
| 4,457,185 A | | 7/1984 | Yoshida et al. | |
| 4,485,905 A | | 12/1984 | Radbo et al. | |
| 4,518,070 A | | 5/1985 | Ooka | |
| 4,550,817 A | | 11/1985 | Euler | |
| 4,576,269 A | | 3/1986 | Hamane et al. | |
| 4,592,458 A | | 6/1986 | Matsuki et al. | |
| 4,645,049 A | | 2/1987 | Matsuda et al. | |

(Continued)

FOREIGN PATENT DOCUMENTS

JP 55044166 A * 3/1980 ........... F16D/43/06

*Primary Examiner*—Richard M. Lorence
(74) *Attorney, Agent, or Firm*—Knobbe Martens Olson & Bear LLP

(57) ABSTRACT

A motorcycle clutch having a drive portion including a clutch basket assembly, and a driven portion including a clutch hub. A plurality of drive clutch plates are driven by the clutch basket assembly and a plurality of driven clutch plates are driven by the clutch hub. A pressure plate is coupled for rotation with the drive portion and is capable of axial movement from at least a first position to a second position. A release plate is capable of axial movement from at least a first position to a second position. The pressure plate and release plate are arranged on opposing sides of an alternating arrangement of the frictional and metal clutch plates. A plurality of engagement balls are placed between the clutch basket assembly and the pressure plate. The clutch basket assembly includes a plurality of ramped surfaces configured such that radial movement of the engagement balls results in axial movement of the pressure plate from its second position to its first position to automatically engage the clutch. The release plate is movable between a first and second position to manually disengage the clutch.

8 Claims, 7 Drawing Sheets

U.S. PATENT DOCUMENTS

| | | |
|---|---|---|
| 4,690,258 A | 9/1987 | Teraoka et al. |
| 4,697,677 A | 10/1987 | Janiszewski |
| 4,732,251 A | 3/1988 | Tipton |
| 4,848,506 A | 7/1989 | Shimada et al. |
| 5,033,598 A | 7/1991 | Tipton |
| 5,070,984 A | 12/1991 | Fehring |
| 5,360,381 A | 11/1994 | Swist |
| 5,361,882 A | 11/1994 | Tipton |
| 5,413,200 A * | 5/1995 | Hirata .................. 192/40 |
| 5,638,935 A | 6/1997 | Fehring |
| 5,862,717 A | 1/1999 | May et al. |
| 6,315,096 B1 | 11/2001 | Dairokuno et al. |
| 6,533,056 B1 * | 3/2003 | Maimone ............... 180/230 |
| 2002/0185355 A1 * | 12/2002 | Drussel et al. ............ 192/83 |

* cited by examiner

MOTORCYCLE AUTOMATIC CLUTCH WITH MANUAL RELEASE

PRIORITY INFORMATION

This application is a continuation of U.S. patent application Ser. No. 09/842,367, filed Apr. 25, 2001, issued as U.S. Pat. No. 6,533,056, which claims priority from U.S. Provisional Patent Application No. 60/199,490, filed Apr. 25, 2000, the entireties of which are incorporated by reference herein.

BACKGROUND OF THE INVENTION

1. Field of the Invention

The present invention relates generally to motorcycle clutches. More particularly, the present invention relates to clutches for off-road racing motorcycle applications.

2. Description of the Related Art

Off-road racing motorcycles intended for older, and often more experienced, riders often utilize a manually controlled clutch and a multiple speed transmission, offering up to five or six different gear ratios. Conversely, most off-road motorcycles for riders of four to nine years in age utilize an automatically engaging clutch and single-speed transmission.

Eliminating the need to shift gears and control the engagement of the clutch reduces learning time for younger, or inexperienced, riders. An automatically engaging clutch also improves safety by allowing inexperienced riders to fully concentrate on maneuvering the motorcycle. Furthermore, in off-road motorcycle competitions (e.g., motocross races), riders in certain age groups and/or engine displacement categories, are required to ride a single speed motorcycle equipped with an automatically engaging clutch.

However, the clutch is not only used by motorcycle riders and racers when shifting the transmission, but is also used to control the overall speed and power delivery of the motorcycle by interrupting engine torque from reaching the rear wheel. For example, the rider may slow the overall speed of the motorcycle while negotiating a corner by briefly disengaging the clutch, instead of altering the throttle position. This method keeps engine speed high in order to have substantial engine torque available immediately upon subsequent re-engagement of the clutch. Experienced off-road motorcycle riders also use a manual clutch to produce a "burst" of acceleration, irrespective of shifting the transmission.

A rider of a motorcycle having an automatically engaging clutch must reduce the position of the throttle to slow the speed of the motorcycle in order to negotiate a corner. Upon exiting the corner, as the rider increases the throttle position, there is a delay in engine torque reaching the rear wheel of the motorcycle due to the time that is necessary for the automatic clutch to re-engage. While this condition may be tolerable for recreational or novice riders, it presents a disadvantage to experienced riders, and racers, of motorcycles having an automatic clutch.

Therefore, a need exists for an improved automatically engaging clutch that may be disengaged without having a delay in torque transfer upon subsequent re-engagement.

SUMMARY OF THE INVENTION

It is therefore an object of a preferred embodiment to provide a motorcycle clutch utilizing engagement balls capable of radial movement upon ramped surfaces, at engine speeds above a predetermined threshold, in order to automatically engage the clutch and pass engine-produced torque through the clutch to the transmission and, eventually, to the rear wheel of the motorcycle. The clutch additionally includes a release plate is provided for permitting manual disengagement of the clutch while in its automatically engaged mode.

As a related object, ball detents are provided to allow the engine velocity required for engagement of the clutch to be altered by selection of the diameter of ball detents.

According to another object, the angle of the ramped surfaces provided for directing the engagement balls may be changed so as to alter the portion of force distributed axially to engage the clutch.

According to a preferred embodiment, a motorcycle clutch assembly comprises a drive portion, which acts as an input of the clutch and is configured to be driven by an output of a motorcycle engine. A driven portion of the clutch acts as the output of the clutch and is configured to drive a secondary gear of a transmission of a motorcycle. A pressure plate is coupled for rotation with the drive portion and is capable of axial movement from at least a first position to a second position. A release plate is coupled for rotation with the driven portion and is capable of axial movement from at least a first position to a second position. A plurality of drive clutch plates coupled for rotation with the drive portion and a plurality of driven clutch plates coupled for rotation with the driven portion are arranged, in an alternating manner, between the pressure plate and the release plate. The clutch has at least a first mode wherein the pressure plate is in its second position and no engine torque is transferable from the drive portion to the driven portion. The clutch has at least a second mode wherein the pressure plate is in its first position, the release plate is in its first position and engine torque is transferable from the drive portion to the driven portion. The clutch additionally has at least a third mode wherein the pressure plate is in its first position and the release plate is in its second position wherein no engine torque is transferable from the drive portion to the driven portion.

A clutch configured in this manner provides at least three advantageous modes of operation. In the first mode, the pressure plate is not exerting pressure on the plurality of clutch plates and relative rotation is allowed between the drive clutch plates and driven clutch plates. Therefore, no torque is transferred between the engine and transmission. In a second mode, the pressure plate has moved to its first position and the drive clutch plates and driven clutch plates are coupled between the pressure plate and release plate. In this mode, engine torque is passed through the clutch assembly to the transmission, and eventually the rear wheel of the motorcycle. In a third mode, the pressure plate is, again, in its first position, however, the release plate is axially displaced away from the assembly of clutch plates, to its second position, once again permitting relative rotation between the drive and driven clutch plates. In this mode, no torque is passed through the clutch assembly. Thus, no engine-produced torque reaches the transmission and, subsequently, the rear wheel of the motorcycle.

Advantageously, a clutch configured substantially as described above is capable of automatic engagement at engine speeds above a predetermined threshold. In addition, the clutch may be manually disengaged and subsequently re-engaged without a delay in torque transfer.

According to a preferred embodiment, a motorcycle comprises a frame and an engine, having an output shaft, is connected to the frame. A transmission, having a transmission input shaft, is fixed relative to the engine. A clutch is provided, including a drive portion coupled for rotation with the engine output shaft. A driven portion is coupled for rotation with the transmission input shaft. The clutch has a first mode wherein the drive portion and the driven portion are not coupled when the engine is below a predetermined engine speed. The clutch also has a second mode wherein the drive portion and the driven portion are coupled when the engine is above the predetermined engine speed. The clutch has a third mode wherein the drive portion and the driven portion are not coupled when the engine is above the predetermined engine speed.

BRIEF DESCRIPTION OF THE DRAWINGS

These and other features of this invention will now be described with reference to the drawings of a preferred embodiment, which is intended to illustrate and not to limit the invention. The drawings contain the following figures.

DETAILED DESCRIPTION OF THE PREFERRED EMBODIMENT

Figure 1:
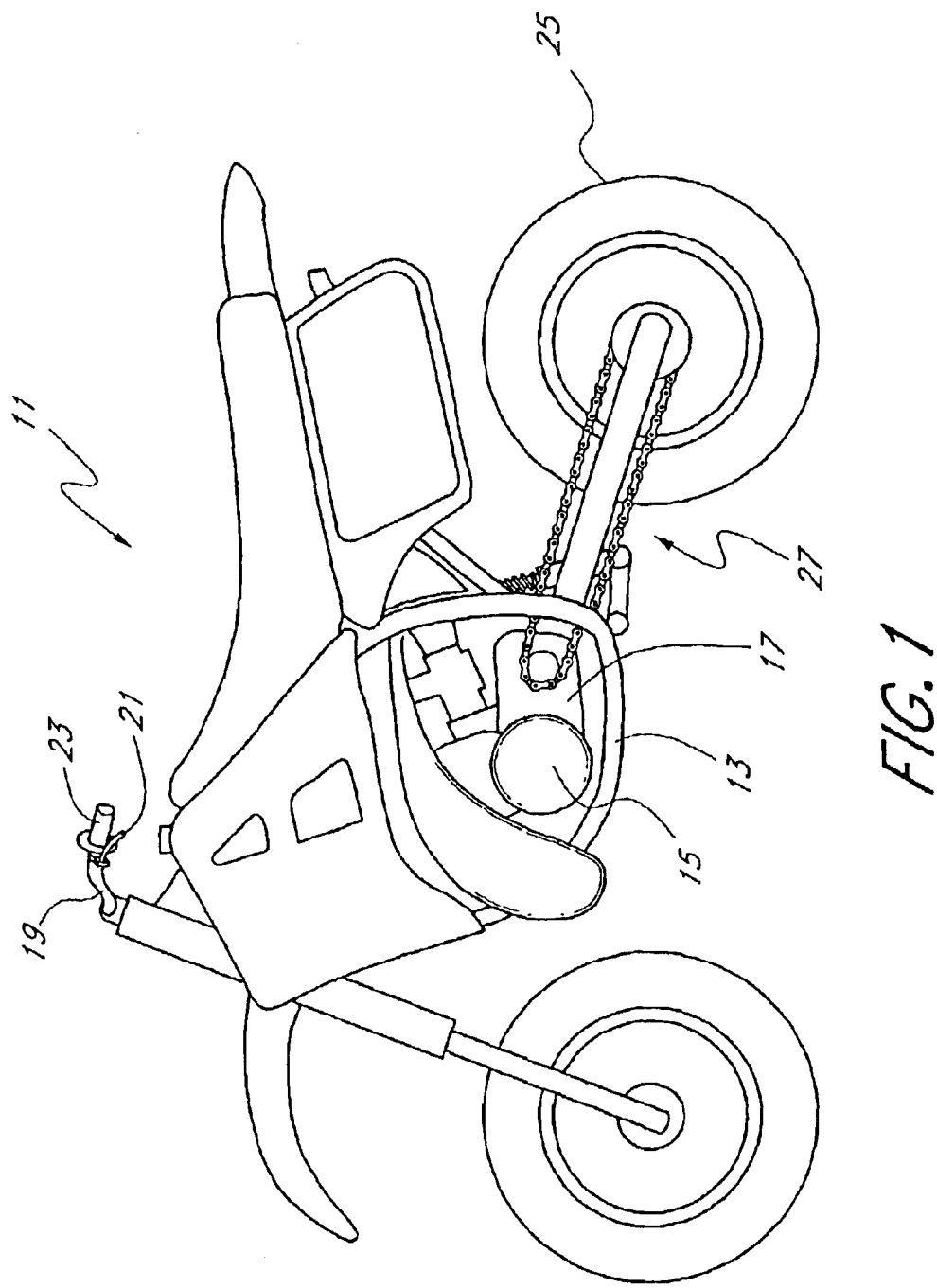
FIG. 1 is a perspective view of motorcycle having a clutch constructed in accordance with a preferred embodiment.

With reference to FIG. 1, a motorcycle 11 including a clutch (not shown) constructed in accordance with a preferred embodiment is illustrated. The motorcycle has a frame 13 with an engine 15 mounted therein. The engine 15 preferably operates on a two-cycle, crankcase compression principal and has a displacement of approximately fifty cubic centimeters. However, a clutch constructed according to a preferred embodiment may be utilized in a motorcycle having an engine which operates according to alternative operating principles (i.e., four-cycle) or is of different engine displacements.

A transmission 17 is fixed relative to the engine 15 and, when engaged, transfers engine-produced torque to the rear wheel 25 of the motorcycle 11, preferably through a chain and sprocket drive 27. Of course, other drive arrangements (e.g., belt drive or shaft drive) may also be used.

The motorcycle 11 also includes a handlebar assembly 19 connected to the frame 13 and operable to steer the motorcycle 11. One or more rider controls may be mounted on the handlebar assembly 19, including a control lever 21 and a throttle 23. The control lever 21 is operable to manually disengage the clutch (FIG. 2) of the motorcycle 11 typically located generally adjacent a crankcase (not shown) of the engine 15, as is well known to those of skill in the art. The throttle 23 is configured to adjust a throttle valve (not shown), thereby adjusting the engine speed of the engine 15, as is well known in the art.

Figure 2:
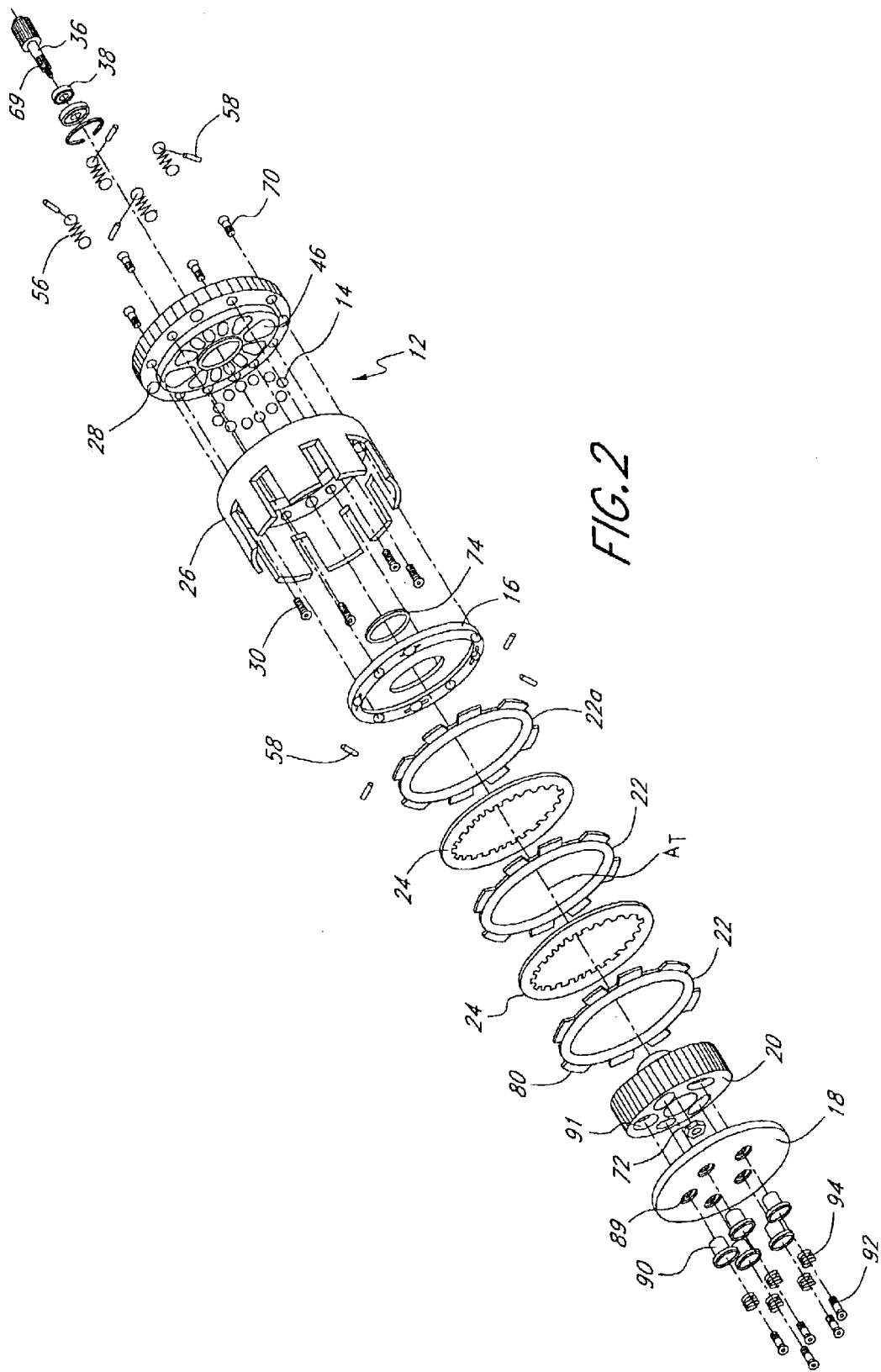
FIG. 2 is an exploded view of a motorcycle clutch having features in accordance with a preferred embodiment.
Figure 3:
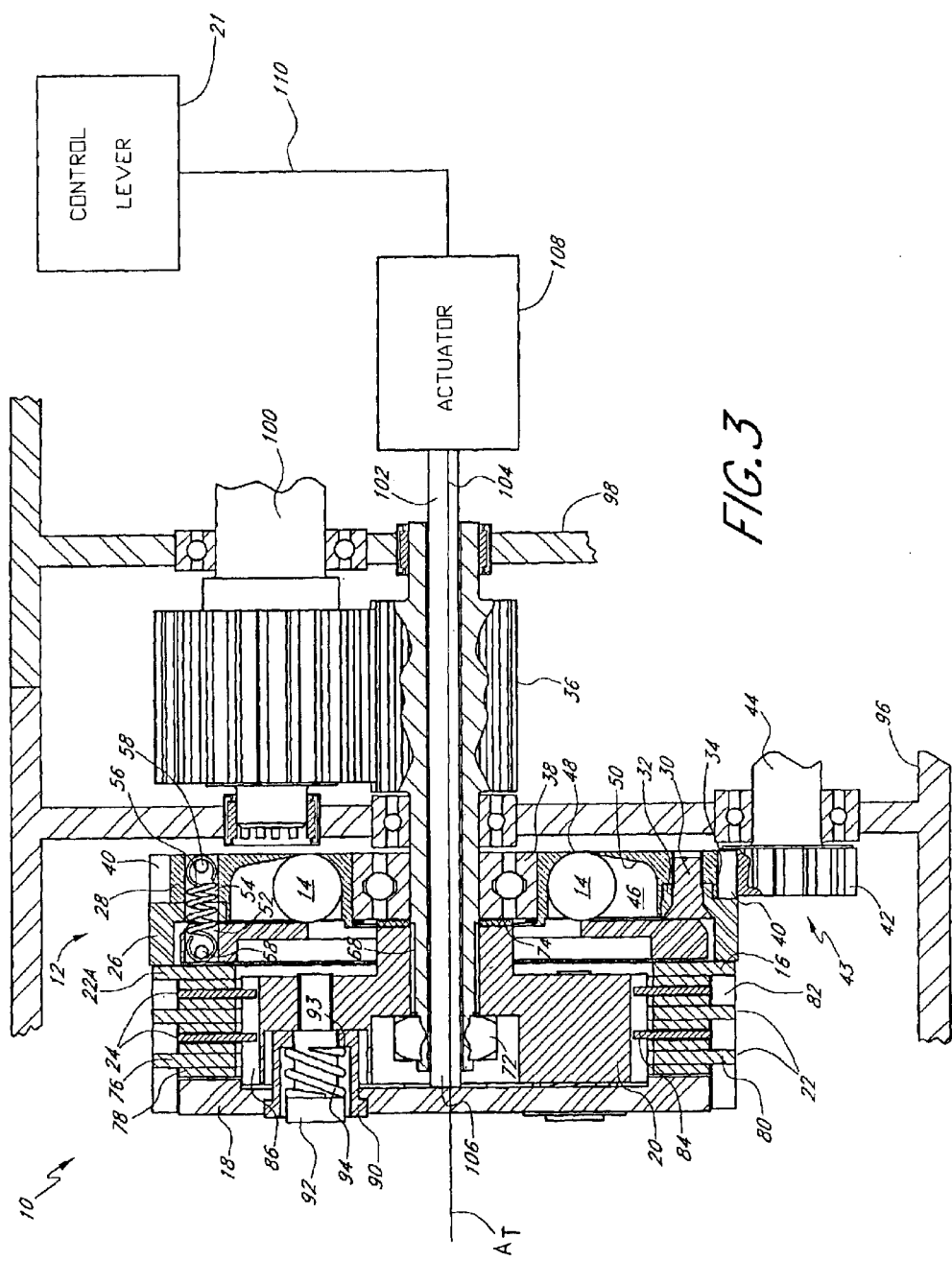
FIG. 3 is a cross-sectional view of the motorcycle clutch of FIG. 2 installed in the motorcycle of FIG. 1.

With reference to FIGS. 2 and 3, a clutch 10 is shown in an exploded assembly view and in the motorcycle 11, respectively. The clutch 10 is comprised primarily of the clutch basket assembly 12, a set of engagement balls 14, a pressure plate 16, a release plate 18, a clutch hub 20 and a series of drive clutch plates 22, 22a and driven clutch plates 24. The clutch basket assembly 12 is comprised of a basket 26 and a base 28 secured thereto by a plurality of clutch basket bolts 30.

The basket 26 includes a cylindrical drive tab 32 associated with a counter-bore 34 in the base 28 at each connection point between the basket 26 and base 28. The drive tabs 32 provide a larger area in which to disperse the shear forces between the basket 26 and the base 28 as compared to the area of the clutch basket bolts 30 alone. A preferred clutch basket assembly 12 is connected at four points by four clutch basket bolts 30 dispersed along a common radius from the center axis of the clutch 10 at approximately equal angles.

The clutch basket assembly 12 is rotatably supported on the secondary transmission gear 36 by the clutch basket bearing 38, and is able to rotate with respect to the secondary transmission gear 36. The base 28 of the clutch basket assembly 12 is the input to the clutch 10. The base 28 has gear teeth 40 located at a radial distance from the center axis $A_T$ of the secondary transmission gear 36. The gear teeth 40 of the clutch basket base 28 are meshed with gear teeth 42 of an output gear 43 mounted on an output shaft 44 of the engine (not shown). Thus, the clutch basket assembly 12 is driven by the output of the engine.

The base 28 of the clutch basket assembly 12 defines a plurality of engagement ball pockets 46 operable for retaining a corresponding number of engagement balls 14. Each engagement ball pocket 46 preferably includes a hole, or ball detent 48 (FIG. 5), defined in a radially inward position and a surface 50 that is ramped toward the basket 26 when moving radially outward from the center axis $A_T$. The base 28 of a preferred clutch 10 is made from H13 heat-treated tool steel to prevent wear from movement of the engagement balls 14, however, other types of hardened materials may be used.

The clutch 10 includes a pressure plate 16 which is in contact with the engagement balls 14 opposite the clutch basket base 28 and is capable of axial movement with respect to the clutch basket assembly 12. Both the pressure plate 16 and clutch basket assembly 12 have a set of corresponding apertures 52, 54 to allow a set of pressure plate springs 56 to pass through. The pressure plate springs 56 are retained by a set of retaining pins 58 on either end. The retaining pins 58 rest in retaining pin cavities 60, 62 (FIG. 5) in opposite sides of the pressure plate 16 and clutch basket assembly 12, respectively. Thus, the pressure plate springs 56 act to oppose the axial movement of the pressure plate 16 away from the base 28 due to movement of the engagement balls 14. To ensure proper axial movement of the pressure plate 16, the clutch 10 preferably utilizes at least two engagement balls 14 and two pressure plate springs 56. However, more preferably the clutch 10 uses twelve engagement balls 14 and four pressure plate springs 56.

The pressure plate 16 and clutch basket assembly 12 additionally have a second set corresponding apertures 64, 66 relating to a set of pressure plate limit bolts 70. The pressure plate limit bolts 70 are disposed at approximately the same radial distance from the center axis $A_T$ as the pressure plate springs 56, only rotated approximately 45 therefrom (FIG. 2). The pressure plate limit bolts 70 advantageously limit the axial travel of the pressure plate 16 toward the series of frictional 22 and driven clutch plates 24.

Figure 4:
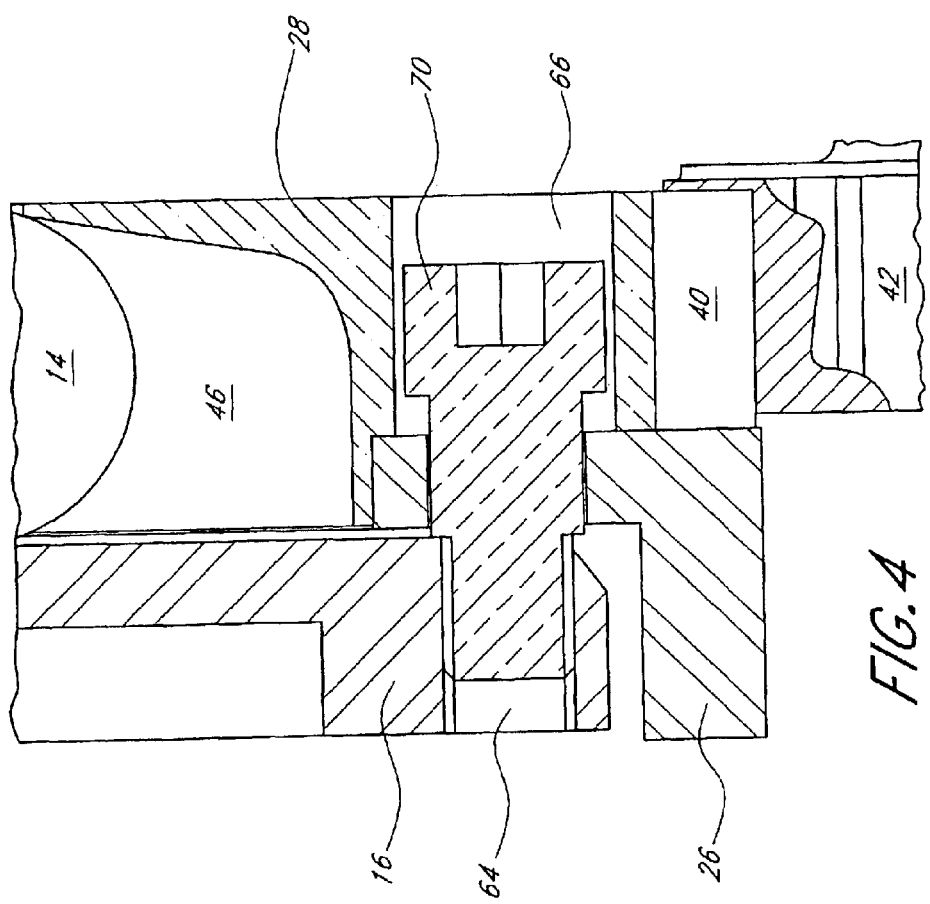
FIG. 4 is a partial cross-sectional view showing in detail the pressure plate limit bolts of the clutch of FIG. 2.

FIG. 4 illustrates a partial cross-section of the clutch 10, taken along a radial plane which bisects one of the pressure plate limit bolts 70 (FIG. 2). As shown, each of the pressure plate limit bolts 70 is of a typical shoulder bolt variety having a head portion, a shaft portion of smaller diameter than the head portion and an externally threaded portion of generally equivalent diameter to the shaft portion. The aperture 64 in the pressure plate 16 is internally threaded and mates with the threaded portion of a pressure plate limit bolt 70. A portion of the aperture 66 defined by the base 28 of the clutch basket assembly 12 is of a larger diameter than the head portion of the pressure plate limit bolt 70. A portion of the aperture 66 defined by the basket 26 of the clutch basket assembly 12 is of a slightly larger diameter than the shaft portion of the pressure plate limit bolt 70, and is sized small enough to prevent the head portion from passing therethrough.

The shaft portion of the pressure plate limit bolt 70 is disposed within a portion of the aperture 66 defined by the clutch basket base 28 and fixes the pressure plate 16 for rotation with the clutch basket assembly 12 while allowing axial movement relative thereto. The length of the shaft portion of the limit bolt 70 may be varied to adjust the distance the pressure plate 16 may travel in an axial direction. Preferably, at least two pressure plate limit bolts 70 are used to ensure the pressure plate 16 remains parallel to the clutch basket base 28 while moving in an axial direction with respect thereto. More preferably, the clutch 10 utilizes four pressure plate limit bolts 70.

With reference again to FIGS. 2 and 3, the clutch 10 also includes a clutch hub 20. The clutch hub 20 is fixed for rotation with the secondary gear 36 of the transmission through a splined aperture along its center axis, the splines 68 (FIG. 3) of which engage mating splines 69 on the secondary gear 36 of the transmission. The clutch hub 20 is prevented from moving axially relative to the secondary gear 36 of the transmission with a nut 72 and is prevented from direct contact with the clutch basket bearing 38 by a wear washer 74.

The clutch 10 additionally includes a series of drive clutch plates 22, 22a and driven clutch plates 24. The drive clutch plates 22 are desirably comprised of a base member 76 and frictional pads 78 attached to either, or both, sides thereof The base member 76 is preferably steel or aluminum, while the frictional pads 78 are a material having a high frictional coefficient. The friction pad material may be of a paper or woven material type common to the automotive and motorcycle industry depending on the frictional and wear characteristics desired. Attachment of the frictional pads 78 to the base member 76 may be accomplished with adhesives or by suitable mechanical means, such as riveting or the like. Alternatively, the drive plates 22, 22a may be formed as an integral unit.

The drive clutch plates 22, 22a have a number of tabs 80 along the radially outermost edge that cooperate with axial slots 82 in the clutch basket assembly 12. The drive clutch plates 22, 22a are thereby fixed for rotation with the clutch basket 12, but are capable of axial movement in relation thereto.

The driven clutch plates 24 are made from steel or aluminum and have a number of gear teeth 84 along the radially innermost edge that cooperate with spline teeth 86 on the radially outermost surface of the clutch hub 20. The driven clutch plates 24 are fixed for rotation with the clutch hub 20, but are capable of axial movement in relation thereto.

The series of clutch plates 22, 22a, 24 are arranged on the clutch basket member 12 and clutch hub 20, respectively, in an alternating pattern. Preferably, a single-sided drive clutch plate 22a is assembled nearest the pressure plate 16, having a friction pad 78 only on the surface opposite the pressure plate 16. This allows for a more compact arrangement since there is no relative rotation between the pressure plate 16 and the single-sided drive clutch plate 22a, thus making friction material unnecessary. Preferably, all the other drive clutch plates 22 have friction pads 78 on both sides.

As mentioned above, the series of clutch plates 22, 22a, 24 are assembled with the single-sided drive clutch plate 22a closest to the pressure plate 16 and then alternating driven clutch plates 24 and drive clutch plates 22, ending with a frictional clutch plate 22. Preferably, the clutch 10 utilizes a total of five clutch plates arranged in the manner described. However, a greater, or lesser, number of clutch plates 22, 22a, 24 may be used.

The clutch 10 also includes a release plate 18, preferably made from steel or aluminum. The release plate 18 defines a number of cylindrical apertures 89 (FIG. 2) passing axially therethrough, which are counter-bored to receive a spring pocket member 90. The cylindrical apertures are located at a radial distance from the center axis $A_T$ of the clutch 10 so as to be substantially aligned with cylindrical receiving bores 91 (FIG. 2) in the clutch hub 20. Each receiving bore 91 has an internally threaded aperture extending axially through the clutch hub 20 from generally the center of the receiving bore 91.

The spring pocket members 90 are preferably made from steel or aluminum. Each of the spring pocket members 90 has a lip at a first end, which is configured to rest in the counter-bore of the cylindrical apertures 89, thereby preventing it from passing through the release plate 18. Each of the spring pocket members 90 also includes an aperture at a second end. The diameter of the aperture is such that it allows a release bolt 92 to pass through but provides an engagement surface 93 for a release coil spring 94.

The release bolt 92 is of a typical shoulder-bolt variety with the unthreaded portion of the shoulder-bolt providing a shaft to retain the release spring 94 and the externally threaded portion cooperating with the internally threaded aperture in the clutch hub 20. With such an arrangement, the release plate 18 is fixed for rotation with the clutch hub 20, but is capable of axial movement with respect thereto, subject to the resistive force of the release springs 94.

The release springs 94 may be changed in type, spring rate or number to provide desired resistance to force provided by the pressure plate 16. Preferably, the springs 94 are of a coil-type and five (5) of such springs are utilized.

The orientation of the clutch 10 in the motorcycle 11 is shown in detail in FIG. 3. The engine 15 of the motorcycle provides two housings or cases: the clutch-side engine case 96 and the ignition-side engine case 98. As noted earlier, the engine of the motorcycle is equipped with an output shaft 44 having an output gear 43 and rotatably supported in the clutch-side engine case 96. The output gear 43 includes a number of gear teeth 42 which are meshed with the gear teeth 40 of the clutch basket assembly 12, thus operable for transferring torque produced by the engine to the clutch 10.

The transmission 17 of the motorcycle is equipped with a secondary gear 36, which is supported for rotation by both the clutch-side and ignition-side engine cases 96, 98, respectively. The secondary gear 36 is fixed for rotation with the clutch hub 20 and transfers engine torque from the clutch 10 to the transmission 17. The secondary gear 36 further is equipped with gear teeth in meshed engagement with gear teeth of the output shaft 100 of the transmission 17.

The output shaft 100 is supported for rotation by both the clutch-side and ignition-side engine cases 96, 98 and acts as the output of the transmission 17 to provide engine torque to the rear wheel 23 of the motorcycle (FIG. 1). Torque transfer to the rear wheel is typically by chain and sprocket drive 27 (FIG. 1), but may be of shaft, belt or similar drive type.

The clutch 10 additionally includes a release shaft 102. The release shaft 102 is housed within a cylindrical aperture extending axially through the secondary gear 36. A first end 104 of the release shaft 102 is in a position to be engaged by an actuator 108 and the second end 106 is in close proximity to the release plate 18. The release shaft 102 is capable of axial movement so as to move the release plate 18 away from the assembly of frictional 22 and driven clutch plates 24.

The actuator 108 may be mechanical (e.g. cam-type) or hydraulic and is configured to selectively produce axial movement of the release shaft 102. The actuator 108 is instructed by the control lever 21 (shown schematically in FIG. 2) to produce movement of the release shaft 102 or allow its return. The control lever 21 may act on the actuator 108 by means of a braided steel cable (i.e., a bowden wire) or a hydraulic line, in the cases of a mechanical or hydraulic actuator, respectively.

A preferred actuator 108 comprises a cam shaft assembly, having a cam surface in contact with a first end 104 of the release shaft 102, and being configured to translate rotational motion of the assembly into linear motion of the release shaft 102. The cable 110 is preferably a bowden wire assembly and is connected to a lever arm of the cam shaft assembly. Engagement of the control lever 21 creates a pulling force on the cable 110 which, in turn, rotates the cam shaft assembly, thereby causing linear movement of the release shaft 102.

Figure 5:
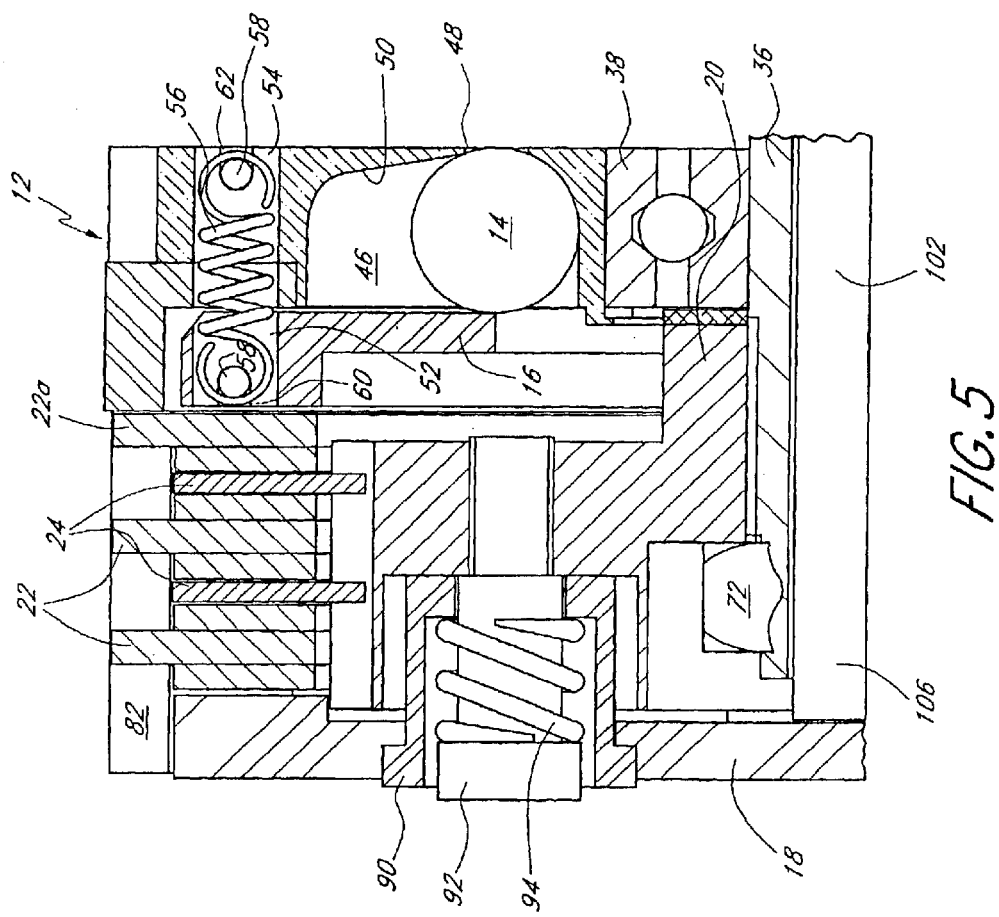
FIG. 5 is a partial cross-sectional view of the motorcycle clutch of FIG. 2 in a disengaged mode.

The clutch 10 preferably has at least three modes of operation: disengaged, automatically engaged and manually released. FIG. 5 is a partial cross-section of the clutch 10 in a disengaged mode. The clutch 10 is in a disengaged mode when the engine is not rotating or is at low angular velocities (revolutions per minute).

When the engine 15 and, thus the output gear 43 mounted on the output shaft 44 of the engine 15 and accordingly, the clutch basket assembly 12 is operating at a low angular velocity (i.e., below a predetermined engagement speed), radially outward movement of the engagement balls 14 is resisted by a combination of the pressure plate 16 and the ball detents 48. The pressure plate 16 applies substantially axial force on the engagement balls 14 via the pressure plate springs 56. This force assists in holding the engagement balls 14 within the ball detents 48.

The slots 82 in the clutch basket 12 are of such a depth that when the engagement balls 14 are within the ball detents 48, there is no contact between the pressure plate 16 and the single-sided frictional clutch plate 22a. Thus, the drive clutch plates 22, 22a and driven clutch plates 24 are capable of rotation relative to each other and no torque is transmitted therebetween.

Figure 6:
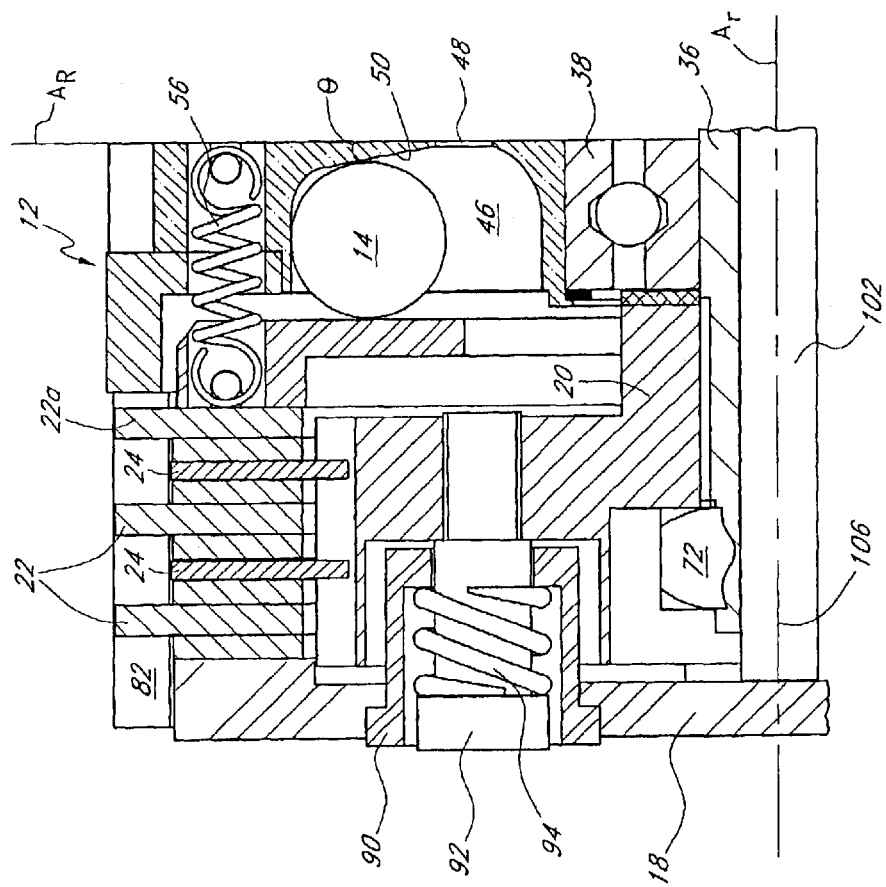
FIG. 6 is a partial cross-sectional view of the motorcycle clutch of FIG. 2 in an automatically engaged mode.

FIG. 6 illustrates the clutch 10 in an automatically engaged mode. This mode preferably occurs when the output shaft 44 of the engine 15 is rotating the output gear 43 (which is, in turn, driving the clutch basket assembly 12) at or above an angular velocity sufficient to move the engagement balls 14 radially outward from their position in the ball detents 48 as a consequence of the rotational force acting upon the engagement balls 14 (i.e., at engine speeds above the predetermined engagement speed).

As the force created on the engagement balls 14 move them in a radially outward manner, the ramped surfaces 50 of the engagement ball pockets 46 cause a simultaneous axial movement of the engagement balls 14 against the pressure plate 16. The resulting force on the pressure plate 16 compresses the stack of drive 22, 22a and driven clutch plates 24 against the release plate 18 until a magnitude of force is achieved that prevents relative rotation between the individual drive 22, 22a and driven clutch plates 24. As will be understood by one of skill in the art, the force necessary to couple the clutch plates 22, 22a and 24 are related to the total frictional area of the clutch plates 22, 22a, 24 and the coefficient of friction therebetween.

When the drive 22, 22a clutch plates and driven clutch plates 24 are rotating as a unit, or coupled, torque is transferred from the clutch basket 12 to the clutch hub 20 via the tabs 80 on the drive clutch plates 22, 22a being driven by the clutch basket 12 and the gear teeth 84 on the driven clutch plates 24 driving the clutch hub 20. As a result, torque produced by the engine is passed through the clutch 10 to the transmission 17, and ultimately the rear wheel of the motorcycle.

Preferably, the release springs 94 are of a spring rate so as to provide sufficient force to prohibit relative rotation of the frictional 22 and driven clutch plates 24 when they are compressed by the above-described automatic engagement of the pressure plate 16. This rate may be adjusted to provide some cushioning effect to the engagement of the clutch 10. In addition, the engagement speed of the present invention may be adjusted to suit the individual output characteristics of the engine.

Advantageously, the ball detent 48 diameter may be adjusted, with respect to the diameter of the engagement balls 14, to determine engagement speed. A smaller diameter would allow the engagement balls 14 to leave the detent 48 at lower angular velocities, while a larger ball detent 48 diameter would serve to hold the engagement balls 14 radially inward until a higher angular velocity is achieved. Desirably, the ball detent 48 diameter is less than the diameter of the engagement balls 14, more preferably, the ball detent diameter 48 is less than one-half the diameter of the engagement balls 14. Most preferably, the ball detent 48 diameter is approximately four-tenths the diameter of the engagement balls 14. Preferably, the ball detent 48 diameter is approximately 0.2 inches and the engagement balls 14 have a diameter of approximately 0.5 inches.

In addition to ball detent 48 diameter, the preload of the pressure plate springs 56 may be adjusted to prevent movement of the pressure plate 16 until a sufficient force is created through rotational velocity to overcome the preload. Less preload would allow the engagement balls 14 to quickly engage, while a higher preload would result in a higher engagement speed.

An angle $\theta$, may be defined between the ramped surfaces 50 of the engagement ball pockets 46 and an axis $A_R$ perpendicular to the axis of rotation (the center axis $A_T$). Advantageously, the angle $\theta$, or incline, may be increased or decreased to adjust the amount of force distributed to the pressure plate 16. The force on the engagement balls 14 due to rotation acts in a radial manner. The proportion of that radial force which is exerted on the pressure plate 16 is determined by the angle $\theta$ of the surfaces 50 for any particular angular velocity. The angle $\theta$ is desirably between 5° and 75°, more preferably between 10° and 35° and most preferably is approximately 21°.

In addition, the radial force generated by rotation is, in part, determined by the mass of the engagement balls 14.

Thus, the mass of the engagement ball 14 may be altered by either changing the diameter or material used. A current version of the clutch 10 utilizes steel ball bearings.

Figure 7:
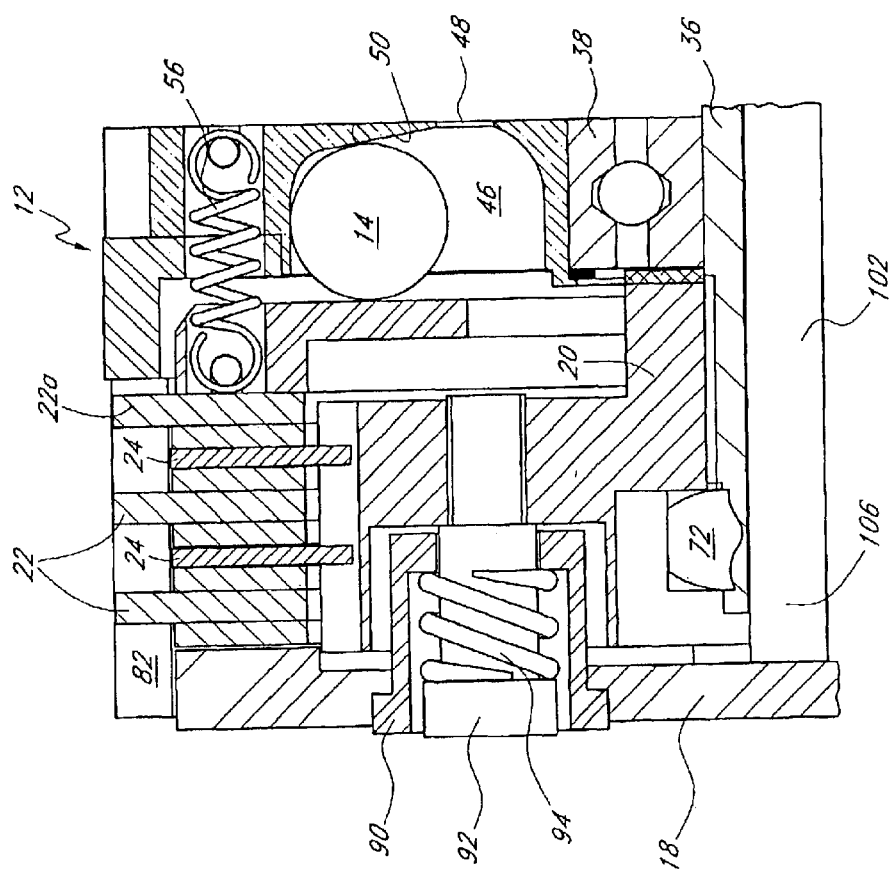
FIG. 7 is a partial cross-sectional view of the motorcycle clutch FIG. 2 in a manual release mode.

FIG. 7 illustrates the clutch 10 in a manually released mode. In this mode, the engine 15 has an angular velocity above its engagement speed, and thus the engagement balls 14 have caused axial movement of the pressure plate 16 sufficient to engage the clutch plates 22, 22a, 24. To achieve the manually released mode, a rider of the motorcycle engages the control lever 21, which signals the actuator 108 (FIG. 3) through a cable 110 to cause linear movement of the release shaft 102, along the center axis $A_T$ against the release plate 18. The release shaft 102 causes axial movement of the release plate 18, overcoming the resistance of the release springs 94 until the frictional 22 and driven clutch plates 24 are no longer coupled. At this point, the engine 15 and transmission 17 become disengaged.

Upon subsequent release of the control lever 21 by the rider, the release plate 18 once again couples the frictional 22 and driven clutch plates 24 as a result of release spring 94 force, passing engine-produced torque through the clutch 10 and to the transmission 17. Advantageously, the torque transfer occurs without the delay associated with automatic engagement of the clutch 10 by movement of the engagement balls 14. This allows manual interruption of torque transfer from the engine 15 to the rear wheel 23 to control the speed of the motorcycle 11 while providing immediate torque transfer upon manual re-engagement of the clutch 10.

One skilled in the art will readily recognize from the discussion above, that a preferred embodiment has been disclosed. Accordingly, various changes, modifications and variations can be made without departing from the true spirit and fair scope of the invention.

What is claimed is:

1. A clutch assembly, comprising:
    a first section configured to be connectable to an engine and including a first member defining a first contact surface;
    a second section configured to be connectable to a transmission and including a second member defining a second contact surface, said clutch assembly being configured to move said first member from a relaxed position to an engaged position such that said first contact surface and said second contact surface automatically, frictionally engage one another at or above a threshold engine speed to automatically couple said first section and said second section;
    wherein said clutch assembly is configured such that said first contact surface and said second contact surface are capable of selective, manual disengagement wherein said second member moves from a relaxed position to a disengaged position to selectively uncouple said first section and said second section at engine speeds at or above said threshold engine speed.

2. A clutch assembly, comprising:
    a first section configured to be connectable to an engine and defining a first contact surface;
    a second section configured to be connectable to a transmission and defining a second contact surface, said clutch assembly being configured such that said first contact surface and said second contact surface automatically, frictionally engaged one another at or above a threshold engine speed to automatically coupled said first section and said second section;
    wherein said clutch assembly is configured such that said first contact surface and said second contact surface are capable of selective, manual disengagement to selectively uncouple said first section and said second section at engine speeds at or above said threshold engine speed; and
    wherein said first section comprises a clutch basket and said second section comprises a clutch hub, said clutch assembly additionally comprising a pressure plate coupled for rotation with said clutch basket and defining said first contact surface, a release plate coupled for rotation with said clutch hub and defining said second contact surface, a plurality of clutch plates interposed between said pressure plate and said release plate, wherein said frictional engagement between said first contact surface and said second contact surface occurs through said plurality of clutch plates.

3. The clutch assembly of claim 1, wherein said clutch assembly is configured to be supportable by a crankcase of a motorcycle, said clutch assembly cooperating with a clutch actuation assembly of the motorcycle to permit control of said manual disengagement of said clutch assembly.

4. The clutch assembly of claim 3, wherein said clutch actuation assembly comprises a handlebar-mounted control lever.

5. The clutch assembly of claim 2, additionally comprising a plurality of limit bolts coupling said pressure plate for rotation with said clutch basket, said limit bolts permitting said pressure plate to move axially a predetermined distance from said clutch basket toward said plurality of clutch plates.

6. The clutch assembly of claim 5, wherein said plurality of limit bolts are adjustable relative to said clutch basket such that said predetermined distance is adjustable.

7. The clutch assembly of claim 2, additionally comprising a plurality of engagement balls curried by said clutch basket and being interposed between said clutch basket and said pressure plate, said engagement balls being capable of movement in a radial direction relative to said clutch basket, said clutch basket comprising a plurality of ramped surfaces corresponding with said engagement balls to move said engagement balls in an axial direction in response to radial movement of said engagement balls, wherein axial movement of said engagement balls moves said pressure plate toward said plurality of clutch plates thereby engaging said first and section sections.

8. The clutch assembly of claim 1, wherein said first member remains in said engaged position during said manual disengagement of said clutch assembly at or above said threshold engine speed.

* * * * *